(12) United States Patent
Khare et al.

(10) Patent No.: US 7,167,957 B2
(45) Date of Patent: Jan. 23, 2007

(54) MECHANISM FOR HANDLING EXPLICIT WRITEBACK IN A CACHE COHERENT MULTI-NODE ARCHITECTURE

(75) Inventors: Manoj Khare, Saratoga, CA (US); Lily P. Looi, Portland, OR (US); Akhilesh Kumar, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/896,151

(22) Filed: Jul. 20, 2004

(65) Prior Publication Data
US 2004/0268061 A1 Dec. 30, 2004

Related U.S. Application Data

(63) Continuation of application No. 09/823,791, filed on Mar. 31, 2001, now Pat. No. 6,842,830.

(51) Int. Cl.
*G06F 12/00* (2006.01)

(52) U.S. Cl. .................... 711/151; 711/141; 711/150; 711/168

(58) Field of Classification Search .............. 710/6, 710/7, 20, 21, 36, 39, 40; 709/102, 107; 711/119, 141, 143, 144, 146, 163, 150–152, 711/168; 718/107
See application file for complete search history.

(56) References Cited

U.S. PATENT DOCUMENTS

| | | | |
|---|---|---|---|
| 5,432,918 A * | 7/1995 | Stamm | 711/156 |
| 5,875,472 A * | 2/1999 | Bauman et al. | 711/150 |
| 5,987,571 A * | 11/1999 | Shibata et al. | 711/141 |
| 6,122,714 A * | 9/2000 | VanDoren et al. | 711/150 |
| 6,145,062 A * | 11/2000 | Chittor et al. | 711/154 |
| 6,256,713 B1 * | 7/2001 | Audityan et al. | 711/141 |
| 6,636,949 B1 | 10/2003 | Barroso et al. | |

\* cited by examiner

*Primary Examiner*—Pierre M Vital
(74) *Attorney, Agent, or Firm*—Blakely, Sokoloff, Taylor & Zafman LLP (57) ABSTRACT

A method and apparatus for a mechanism for handling explicit writeback in a cache coherent multi-node architecture is described. In one embodiment, the invention is a method. The method includes receiving a read request relating to a first line of data in a coherent memory system. The method further includes receiving a write request relating to the first line of data at about the same time as the read request is received. The method further includes detecting that the read request and the write request both relate to the first line. The method also includes determining which request of the read and write request should proceed first. Additionally, the method includes completing the request of the read and write request which should proceed first.

11 Claims, 10 Drawing Sheets

Read (PRL) from node A completes before writeback (PMWI) from node B.

FIG. 8A

Writeback (PMWI) from node B completes before read (PRL) from node A.

MECHANISM FOR HANDLING EXPLICIT WRITEBACK IN A CACHE COHERENT MULTI-NODE ARCHITECTURE

This is a continuation of application Ser. No. 09/823,791, filed on Mar. 31, 2001 now U.S. Pat. No. 6,842,830, entitled "Mechanism for Handling Explicit Writeback in a Cache Coherent Multi-Node Architecture," assigned to the corporate assignee of the present invention and incorporated herein by reference. Application Ser. No. 09/823,791 has issued on Jan. 11, 2005 as U.S. Pat. No. 6,842,830.

BACKGROUND OF THE INVENTION

1. Field of the Invention

The invention relates to communications between integrated circuits and more specifically to data transfer and coherency in a multi-node or multi-processor system.

2. Description of the Related Art

Processors and caches have existed since shortly after the advent of the computer. However, the move to using multiple processors has posed new challenges. Previously, data existed in one place (memory for example) and might be copied into one other place (a cache for example). Keeping data coherent between the two possible locations for the data was a relatively simple problem. Utilizing multiple processors, multiple caches may exist, and each may have a copy of a piece of data. Alternatively, a single processor may have a copy of a piece of data which it needs to use exclusively.

If two copies of the data exist, or one copy exists aside from the original, some potential for a conflict in data exists in a multi-processor system. For example, a first processor with exclusive use of a piece of data may modify that data, and subsequently a second processor may request a copy of the piece of data from memory. If the first processor is about to write the piece of data back to memory when the second processor requests the piece of data, stale data may be read from memory, or corrupted data may be read from the write. The stale data results when the write should have completed before the read completed (but did not), thus allowing the read instruction to cause retrieval of the updated data. The corrupted data may result when the read should have completed before the write completed (but did not), thus allowing the read instruction to cause retrieval of the data prior to the update.

BRIEF DESCRIPTION OF THE DRAWINGS

The present invention is illustrated by way of example and not limitation in the accompanying figures.

DETAILED DESCRIPTION

A method and apparatus for a mechanism for handling explicit writeback in a cache coherent multi-node architecture is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

A coherent data architecture should reduce conflicts between nodes within the architecture which need to read and write data at about the same time. For example, processor (or node) A may be reading a first data line for purposes of a calculation at the same time the processor B may be writing the first data line. In some instances, these conflicts will resolve themselves, but attempting to let the conflicts resolve themselves randomly might lead to a non-deterministic system. Therefore, it is preferable to resolve read-write conflicts such as these in a manner which is predictable.

Read-write conflicts may be resolved by sending reads and writes through some sort of controller or port, such as a scalability port. Within the port, addresses of reads and writes may be compared, such that conflicts may be detected. When a conflict is detected, a decision may be made as to whether to stall the read or the write. Such a decision may be made based on a variety of factors, depending on the design of the system, and may consider such things as when the requests were received by the port, the priority of the requests, the nature of the requests, and other considerations. Once a decision is made, one of the conflicting operations will complete, and then the other will complete. Since the decision making will be hardwired, any given situation will have a predictable result, and users of the system (such as system designers and programmers) may adapt their use to the predictable result.

Figure 1:
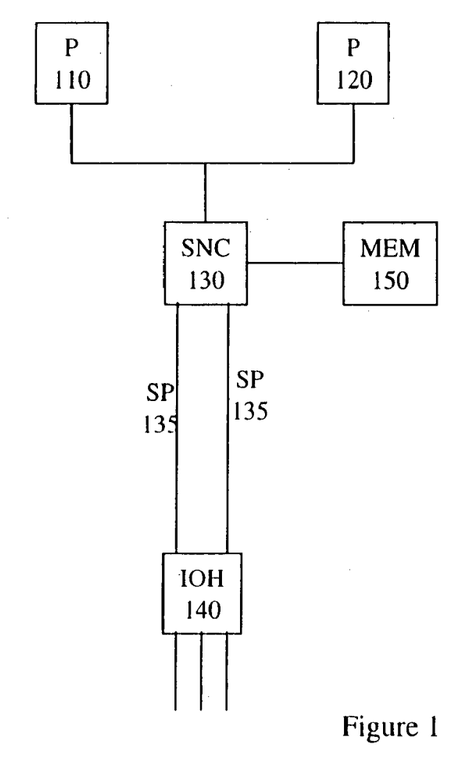
FIG. 1 illustrates a block diagram of an embodiment of a system having multiple processors.

FIG. 1 illustrates a block diagram of an embodiment of a system having multiple processors. A first processor 110 and a second processor 120 are coupled to a node controller 130, and the first processor 110 may be coupled directly to the second processor 120 as well. Memory 150 is also coupled to node controller 130. Furthermore, scalability ports 135 are used to couple node controller 130 to I/O (input/output) hub 140, which in turn may be coupled to various I/O devices (not shown). In such an embodiment, the scalability ports 135 may be used to control accesses to secondary and higher level storage devices, as well as maintain cache coherency within the system. In one embodiment, each of the processor 110, processor 120 and node controller 130 have an associated onboard cache.

Processors typically have caches incorporated within or associated with them, such that a processor may be viewed as including a cache. In multi-processor systems, it is not uncommon to have caches associated with each processor which maintain data lines in one of four states, those states being exclusive, shared, modified, or invalid. Exclusive state is for data lines in use by that processor and locked or otherwise allowed for use by that processor only within the system. Shared state is for data lines which are in use by the processor but may be used by other processors. Modified state is for data lines in use by the processor which have a data value the processor has modified from its original value. Invalid state is for data lines which have been invalidated within the cache. Invalidation may occur when a processor writes a line to memory or when another processor takes a shared line for exclusive use, thus calling into question the validity of the data in the copy of the line the first processor has.

Figure 2:
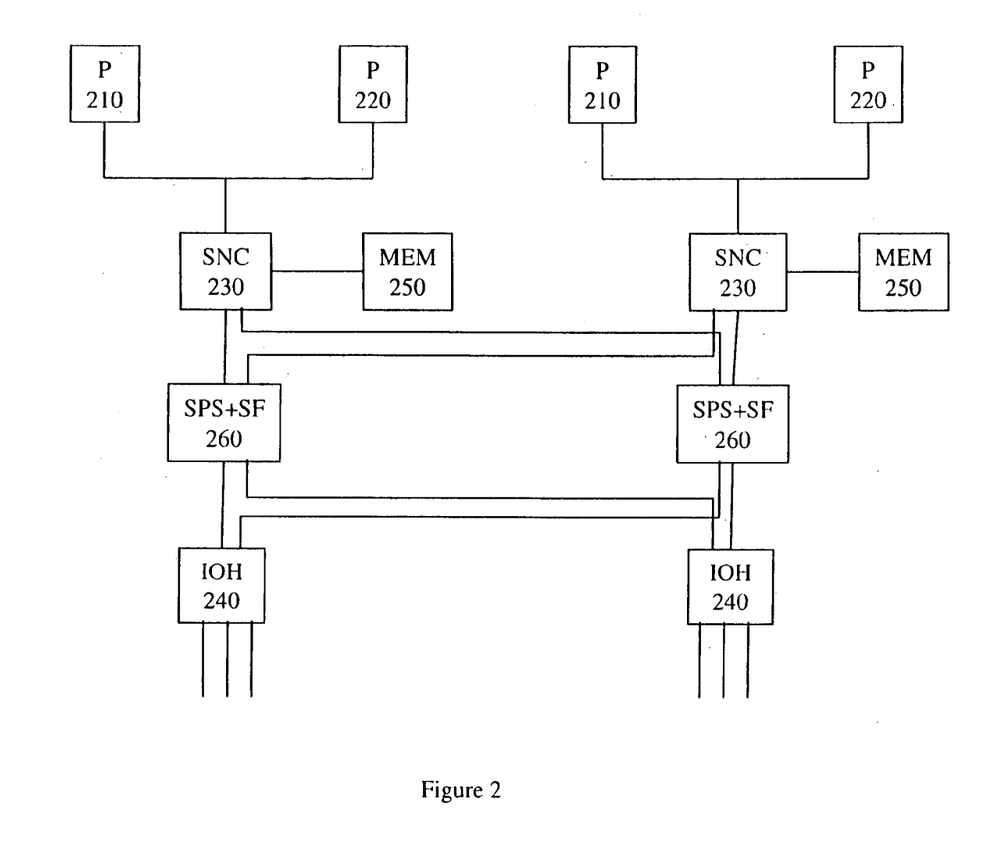
FIG. 2 illustrates a block diagram of an alternate embodiment of a system having multiple processors.

FIG. 2 illustrates a block diagram of an alternate embodiment of a system having multiple processors. A first processor 210 and a second processor 220 are coupled to a first node controller 230. Also coupled to the first node controller 230 is a first memory 250. A third processor 210 and a fourth processor 220 are coupled to a second node controller 230. Also coupled to the second node controller 230 is a second memory 250. Additionally, coupled separately to the first node controller 230 and the second node controller 230 are a first and second scalability port switch and snoop filter 260. Furthermore, coupled to each of the first and second scalability port switches 260 are a first and second I/O hub 240. In one embodiment, each of the processors 210, processors 220, node controllers 230 and I/O hubs 240 have an associated onboard cache.

Figure 3:
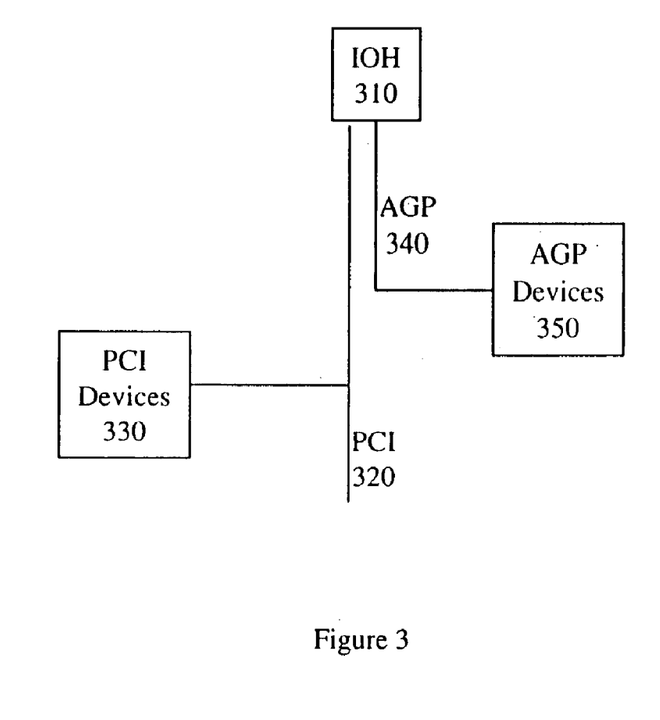
FIG. 3 illustrates a block diagram of an embodiment of an I/O (input/output) subsystem.

FIG. 3 illustrates a block diagram of an embodiment of an I/O (input/output) subsystem. I/O hub 310 is coupled to a PCI bus 320 which in turn is coupled to a PCI device or devices 330. I/O hub 310 is also coupled to an AGP (accelerated graphics port) 340, which in turn is coupled to an AGP device or devices 350. It will be appreciated that numerous implementations of the PCI bus and the AGP exist, any of which may work with various I/O hubs such as I/O hub 310.

Figure 4:
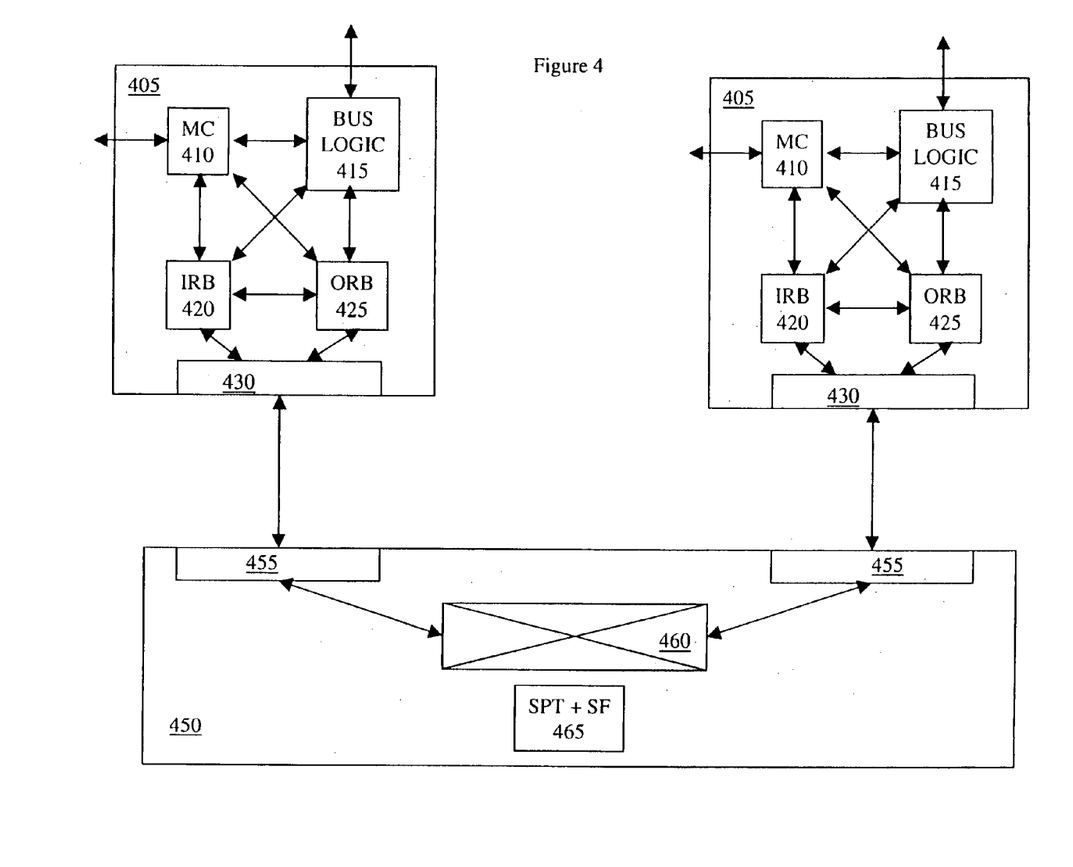
FIG. 4 illustrates a block diagram of an embodiment of a scalability port.

FIG. 4 illustrates a block diagram of an embodiment of a scalability port. The scalability port, in one embodiment, includes a first and second node controller 405 and a switch and snoop filter 450. Each node controller 405 includes a memory control block 410, a bus logic block 415, an IRB (incoming request buffer) block 420 and an ORB (outgoing request buffer) block 425, each of which is coupled to the three other components. Furthermore, the node controller 405 includes a port 430 which is coupled to the IRB 420 and the ORB 425. Also, the memory control block 410 may be coupled to a memory for interfacing therewith and the bus logic block 415 may be coupled to a first and second processor for interfacing therewith for example. The switch 450 includes a first and second port 455, each of which are coupled to a switch 460, and a snoop pending table and snoop filter block 465.

In one embodiment, incoming requests and outgoing requests are generated and responded to by devices outside the scalability port. Each request is routed through the appropriate node controller 405, such that incoming requests (to the port 430) are placed in the IRB 420 and outgoing requests (to the port 430) are placed in the ORB 425. Additionally, within the switch 450, each port 455 receives incoming and outgoing requests which are routed through the switch 460. These requests may be targeted at another node coupled to the switch 450, or may be targeted at a node coupled to another switch 450, in which case the request may either be routed to the appropriate node or ignored respectively. Determining whether the target of the request is coupled to the switch 450 is the function of the snoop filter and table 465, which may be expected to maintain information on what data (by address for example) is being utilized by the nodes coupled to the switch 450.

The scalability port may be utilized to minimize the problem of read-write conflicts, as described below. Note that the discussion of reads and writes focuses on reading and writing lines, which typically refer to lines of data such as those stored in a cache (either onboard or associated with a processor for example). It will be appreciated that lines of data may refer to various amounts of data, depending on how a system is implemented to transfer data.

Figure 5:
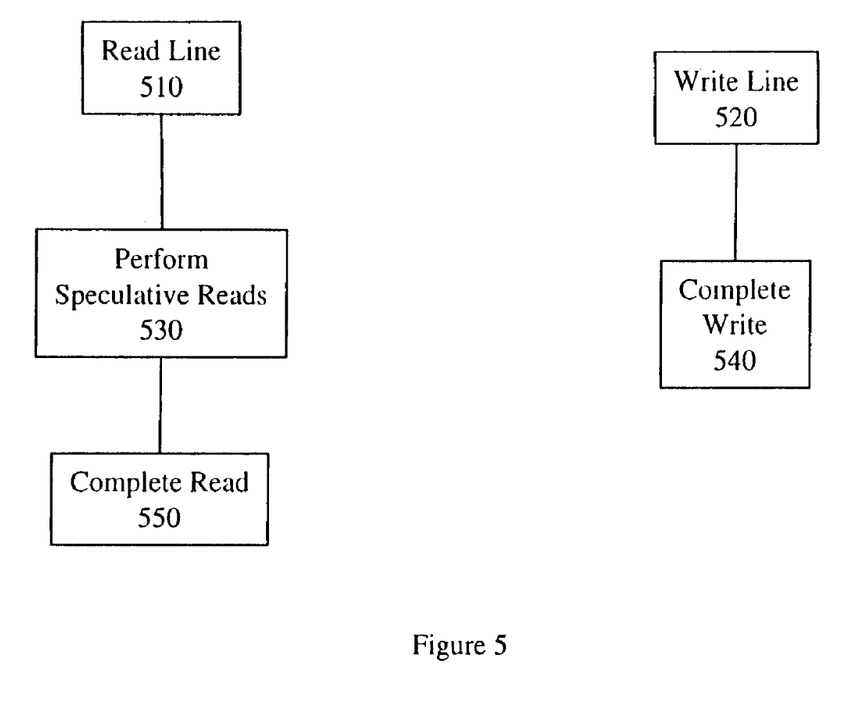
FIG. 5 illustrates a flow diagram of an embodiment of a read-write conflict.

FIG. 5 illustrates a flow diagram of an embodiment of a read-write conflict. At block 510, a first line is read by a first node, while at block 520, at about the same time, the first line is written by a second node. At block 530, speculative reads of the first line occur. At block 540, the write of the first line completes, while at block 550, at about the same time, the read of the first line completes. With two disconnected processes for the read and write of the same line, it is not clear whether the read and write resulted in proper data being read or written. For example, in some situations, the data should be read before it is written, whereas in other situations, the data should be written before it is read. However, typically it is important that the read receive the most up-to-date data possible.

Figure 6A:
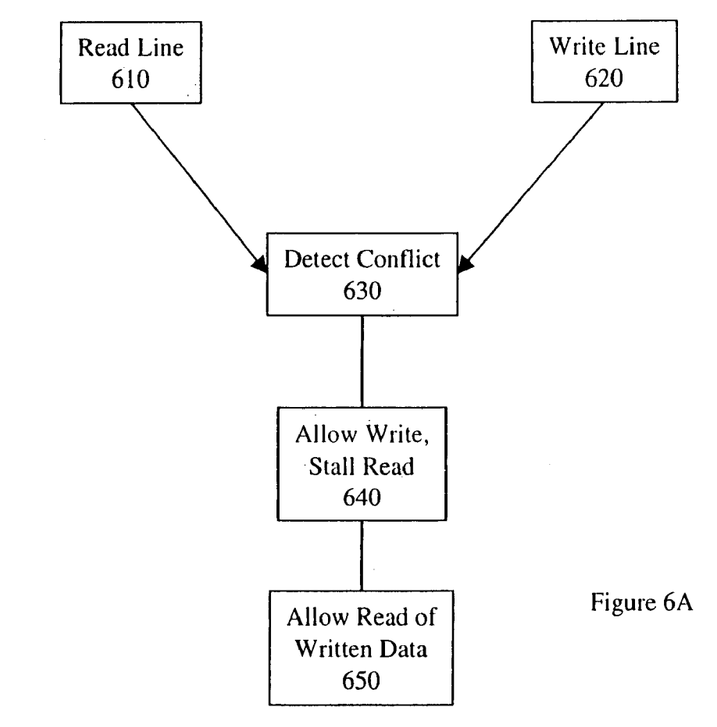
FIG. 6A illustrates a flow diagram of an embodiment of a process of handling a read-write conflict.

FIG. 6A illustrates a flow diagram of an embodiment of a process of handling a read-write conflict. At block 610, a read operation on a first line is commenced by a first node. At block 620, a write operation on the first line is commenced by a second node, at about the same time that the read operation is commenced. At block 630, the conflict between the read and write is detected, such as by comparing the addresses of the read and write requests for example. At block 640, the write is allowed to complete, and the read is delayed so that it will receive or use the data which is written. At block 650, once the write operation has completed, the read operation is allowed to complete, using the data written to the first line by the write operation.

Figure 6B:
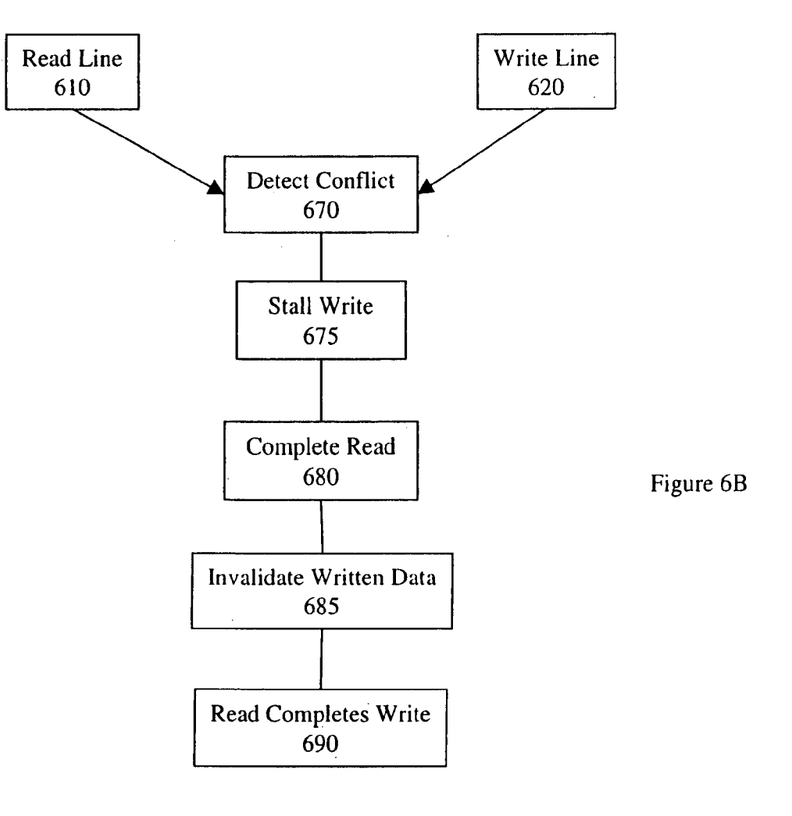
FIG. 6B illustrates a flow diagram of an embodiment of a process of handling a read-write conflict.

FIG. 6B illustrates a flow diagram of an embodiment of a process of handling a read-write conflict. At block 610, a read operation on a first line is commenced by a first node. At block 620, a write operation on the first line is commenced by a second node, at about the same time that the read operation is commenced. At block 670, the conflict between the read and write is detected, such as by comparing the addresses of the read and write requests for example. At block 675, the write operation is stalled. At block 680, the read operation is completed, with the read operation receiving the data to be written from the write operation. At block 685, the written data is invalidated at the second node. At block 690, if appropriate, the read operation completes the write operation without the involvement of the second node, such as through the scalability port. Note that in some instances, the read operation need not complete the write operation, because in some situations the first node will eventually have to write the data it has read, and that will effectively complete the write operation. As will be appreciated, this has the potential to save some of the effort of writing the data back twice, once for the write operation from the second node and once for the write operation the first node will eventually complete with the data it reads.

It will be appreciated that a variety of methods may be used to determine which of the two processes of FIGS. 6A and 6B should be implemented. In most systems, it will be appreciated that there will be times when the process of FIG. 6A should be used and other times when the process of FIG. 6B should be used. However, the exact details for determining which process should be used will necessarily depend on implementation details. In general, it will be appreciated that such a system will determine which of the two processes to use by examining or comparing when and where the two conflicting instructions (read and write) originated and what priorities or properties are assigned to the instructions, such as exclusive or shared use of the subject data for example. Moreover, in some embodiments, an arbitration device independent of the nodes may determine whether to delay the read or write operation.

The embodiment described in the following section is implemented using a specific protocol. It will be appreciated that such a protocol may be implemented in a variety of ways which will be apparent to one skilled in the art. Furthermore, it will be appreciated that variations on such a protocol may be implemented within the spirit and scope of the invention.

Coherent Request Types

In some embodiments, a particular protocol is implemented including the method or by the apparatus in question. In these embodiments, the coherent requests supported on the scalability port are listed in the following table. The table lists all the requests that are used by the coherence protocol, and those requests are then discussed in the following text. In the discussion in this section, a line indicates the length of a coherence unit.

TABLE 1

Coherent Request Types

| Request Type | Name | Description | Allowed Targets |
|---|---|---|---|
| Read | PRLC | Port Read Line Code | Home Node, Coherence Controller |
| | PRLD | Port Read Line Data | |
| | PRC | Port Read Current | |
| Read Invalidate | PRIL | Port Read and Invalidate Line | |
| | PRILO | Port Read and Invalidate Line with OWN# set | |
| | PIL | Port Invalidate Line | |
| | PFCL | Port Flush Cache Line | |
| | PILND | Port Invalidate Line No Data | |
| Memory Update | PMWI, PMWE, PMWS | Port Memory Write. I/E/S indicates state of line at the requesting node. When data is sent along with memory updates, it is indicated with PMW[I/E/S]_D. | |
| Cache Line Replacement | PCLR | Port Cache Line Replacement (Completion not required) | Coherence Controller |
| | PCLRC | Port Cache Line Replacement, Completion Required | |
| Snoop | PSLC/PSLD | Port Snoop Line Code/Data | Coherence Controller, Any Caching Node |
| | PSC | Port Snoop Current | |
| Snoop Invalidate | PSIL | Port Snoop Invalidate Line | |
| | PSILO | Port Snoop Invalidate Line with OWN# set | |
| | PSFCL | Port Snoop Flush Cache Line | |

TABLE 1-continued

Coherent Request Types

| Request Type | Name | Description | Allowed Targets |
|---|---|---|---|
| | PSILND | Port Snoop Invalidate Line No Data | |
| Memory Read Request | PMR | Port Memory Read | Home Node |
| | PMRS | Port Memory Read Speculative | |
| | PMRSX | Port Memory Read Speculative Cancel | |

The Port Read Line (PRLC, PRLD and PRC) requests are used to read a cache line. They are used to both read form from memory and snoop the cache line in the caching agent(s) at the target node. The Port Read requests are always targeted to the coherence controller or the home node of a memory block. A node that is not the home if the block addressed by the transaction never receives a Port Read request. The code and data read and read current requests are different to facilitate different cache state transitions. The Port Read Current (PRC) request is used to fetch the most current copy of a cache line without changing the ownership of the cache line from the caching agent (typically used by an I/O node).

The Port Read and Invalidate Line (PRIL and PRILO) requests are used to fetch an exclusive copy of a memory block. They are used to both read from memory and snoop invalidate a cache line in the caching agent(s) at the node. The Port Read and Invalidate requests are always targeted to the coherence controller or the home node of a memory block. A node that is not home of the block addressed by the transactions never receives these requests. These two request types differ in their behavior when the memory block is found in the modified state at the snooped node. For a PRIL request, the data is supplied to the requesting node and the home memory is updated, whereas for a PRILO request, the data is supplied only to the source node, the home memory is not updated (the requesting node must cache the line in "M" state for PRILO).

The Port Invalidate Line (PIL) request is a special case of the PRIL request with zero length. This request is used by the requesting node to obtain exclusive ownership of a memory block already cached at the requesting node (for example when writing to a cache line in Shared state). Data can never be returned as a response to a PIL request on the scalability port. Due to concurrent invalidation requests, if the line is found modified at a remote caching node, then this condition must be detected either by the requesting node controller or the coherence controller and the PIL request must be converted to a PRIL request. The PIL request is always targeted to the coherence controller or the home node of the requested memory block. A node that is not home of the block addressed by the transaction never receives this request.

The Port Flush Cache Line (PFCL) request is a special case of the PIL request used to flush a memory block from all the caching agents in the system and update the home memory if the block is modified at a caching agent. The final state of all the nodes, including the requesting node, is Invalid and home memory has the latest data. This request is used to support the IA64 flush cache instruction. This request is always targeted to the coherence controller or the home node of the memory block. A node that is not home of the block addressed by the transaction never receives this request.

The Port Invalidate Line No Data (PILND) request is used by the requesting node to obtain exclusive ownership of a memory block without requesting data. The memory block may or may not be present at the requesting node. The memory block is invalidated in all other nodes in the system. If the line is modified at a remote caching node, then the home memory is updated but data is not returned to the requesting node. This request is intended to be used for efficient handling of full line writes which the requesting node does not intend to keep in its cache (for example I/O DMA writes). This request is always targeted to the coherence controller of the home node of the requested memory block. A node that is not home of the block addressed by the transaction never receives this request.

The Port Memory Write (PMWI_D, PMWE_D, PMWS_D) requests with Data are used to update the content of home memory and the state of the line in the coherence controller. Corresponding Port Memory Write (PMWI, PMWE, PMWS) requests without data are used to update the state of the line in the coherence controller. A PMW[I/E/S] request with or without data does not snoop the caching agent(s) at the node. These requests are very similar in nature except for the state of the line at the originating node. The PMWI request indicates that the memory block is no longer cached at the originating node, the PMWS request indicates that the line is in a shared state at the originating node and the PMWE request indicates that the line is in exclusive state at the originating node. The PMW[I/E/S] requests are always targeted to the coherence controller or the home node of the memory block.

The Port Cache Line Replacement (PCLR, PCLRC) requests are used to indicate to the coherence controller that the node no longer has a copy of the memory block in the caching agents at that node. They are intended to be used only by the originating node of the transaction. These requests are always targeted to the coherence controller to facilitate better tracking of the cache state by the coherence controller. A node can generate a PCLR or PCLRC request only when the state of the cache line at the node changes from S or E to I, generation of these requests when the cache line state at a node is I is not allowed to avoid starvation or livelock on accesses from other nodes. A PCLR or PCLRC request could be dropped or processed by the receiving agent without affecting its final state. The protocol supports two versions of this request to facilitate implementation optimization depending on the type of network implemented. The PCLR request does not expect any response back from the receiving agent and the requesting agent can stop tracking this request in its outbound queue as soon as it is sent on the scalability port. The PCLRC request expects a completion response back from the receiving agent and is tracked in the requesting agent till this response is received. Implementation should use the PCLRC request if it cannot guarantee sequential ordering between requests from the requesting node to the coherence controller over the network in order to properly handle race conditions between this request and subsequent reads to the same line. If the implementation can guarantee sequential ordering between requests over the network between two nodes, it can use the PCLR request to save network bandwidth (no completion response) and for reduced buffer requirements in the outbound queue at the requesting node.

The Port Snoop (PSLC, PSLD and PSC) requests are used to initiate a snoop request at a caching node. The snoops caused by the code or data snoop request and the read current request are different to facilitate different cache state transitions. The Port Snoop requests could be targeted to any caching node. These requests do not have any effect on the home memory blocks, they only affect the state of a memory block in the caching agents at the target node.

The Port Snoop (PSLC, PSLD and PSC) requests are used to initiate a snoop request at a caching node. The snoops caused by the code or data snoop request and the read current request are different to facilitate different cache state transitions. The Port Snoop requests could be targeted to any caching node. These requests do not have any effect on the home memory blocks, they only affect the state of a memory block in the caching agents at the target node.

The Port Snoop and Invalidate (PSIL, PSILO and PSILND) requests are used to snoop and invalidate a memory block at a caching node. These requests could be targeted to any caching node. These three request types differ in their behavior when the memory block is found in the modified state at the snooped node. For PSIL request, data is supplied to both the source node and the home memory is updated. For PSILO request, the data is supplied only to the source node, the home memory is not updated. For PSILND request, only the home memory is updated, the data is not supplied to the requesting node.

The Port Snoop Flush Cache Line (PSFCL) request is used to flush a memory block from all the caching agents and update the home memory if the block is modified at a caching agent. This request is used to support the IA64 flush cache instruction and to facilitate backward invalidates due to snoop filter evictions at the coherence controller. The PSFCL request could be targeted to any caching node.

The Port Memory Read (PMR) and Port Memory Read Speculative (PMRS) requests are used to read a home memory block. These requests are used to read memory and do not cause a snoop of caching agent(s) at the home node. They are always targeted to the home node of a memory block. The PMRS request is a speculative request whereas PMR is a non-speculative request. The Port Memory Read Speculative Cancel (PMRSX) request is used to cancel a speculative read request (PMRS) to a cache line. A PMRS request depends on a non-speculative request for the same cache line for confirmation. It is confirmed by a PMR, PRLC, PRLD, PRC, PRIL, or PRILO request for the same cache line. The confirmation request may or may not be due to the same transaction that caused the PMRS request. The PMRS request is cancelled by a PMW[I/E/S] or a PMRSX request for the same cache line. The cancellation request may or may not be due to the same transaction that caused the PMRS request. The PMRS request can be dropped by the responding agent without any functional issue.

Response Types for Coherent Requests

Response types for coherent request transactions on the scalability port are listed in Table 2. These responses are used under normal circumstances or could be combined with special circumstances with proper response status to indicate failed, unsupported or aborted requests.

TABLE 2

Responses for Coherent Requests

| Responses | Description |
| --- | --- |
| PSNR[I/S/M/MS] | Port Snoop Result. I/S/M/MS indicates state of the line in remote nodes (I = Invalid, S = Shared, M = Modified transitioned to Invalid, MS = Modified transitioned to Shared) |
| PCMP | Port Completion Response |

TABLE 2-continued

Responses for Coherent Requests

| Responses | Description |
| --- | --- |
| PRETRY | Port Retry Response |
| PDATA | Port Normal Data Response |
| PSNR[I/S/M/MS]_CMP | Combined response for PSNR[I/S/M/MS] + PCMP |
| PSNR[I/S/M/MS]_D | Combined response for PSNR[I/S/M/MS] + PDATA |
| PCMP_D | Combined response for PCMP + PDATA |
| PSNR[I/S/M/MS]_CMP_D | Combined response for PSNR[I/S/M/MS] + PCMP + PDATA |

The Port Snoop Result (PSNR) response is used to convey the result of snoop back to the requesting node. PSNR response indicates if the line was found in Modified state and the final state of the line at the snooped agent. The state of the line could be Invalid (except for PRC or PSC) at the snooped caching agent(s) (PSNRI), Shared (except for PRC or PSC) at the snooped caching agent(s) (PSNRS), Modified transitioning to Invalid (except for PRC or PSC) at the snooped caching agent (PSNRM) or Modified transitioning to Shared at the snooped caching agent (PSNRMS). For a PRC or PSC transaction, if the cache line state at node is E, S, or I then either a PSNRI or PSNRS response is allowed; if the cache line state is M then either a PSNRM of PSNRMS response if allowed.

The Port Completion (PCMP) response is used in determining the completion of a transaction under certain protocol conditions. This response can be generated only by the home node of the memory block or by the coherence controller for some transactions such as PRC, PSC. PRILO and PSILO.

The Port Retry (PRETRY) response is the protocol level retry response. The corresponding request is retried from the requesting node. This response is used to resolve conflict cases associated with multiple transactions to the same memory block. When the requesting agent receives the PRETRY response to a PMWx request, it retries the PMWx request if no conflict has been detected. If the requesting agent has already seen the conflict before it receives the PRETRY response, the PMWx request is converted into a response to the incoming request.

The Port Normal Data (PDATA) response is used to return the data requested by the corresponding read request. It does not have any other protocol level state information apart from the source node identifier and the transaction identifier of the request to associate it with the proper request.

The protocol also supports certain combined responses which could be used by the responding node to optimize use of bandwidth on SP. The PSNR[I/S/M/MS]_CMP response is same as PSNR[I/S/M/MS]+PCMP, the PSNR[I/S/M/MS]_D response is same as PSNR[I/S/M/MS]+PDATA, the PCMP_D response is same as PCMP+PDATA and the PSNR[I/S/M/MS]_CMP_D response is same as PSNR[I/S/M/MS]+PCMP+PDATA.

Figure 7:
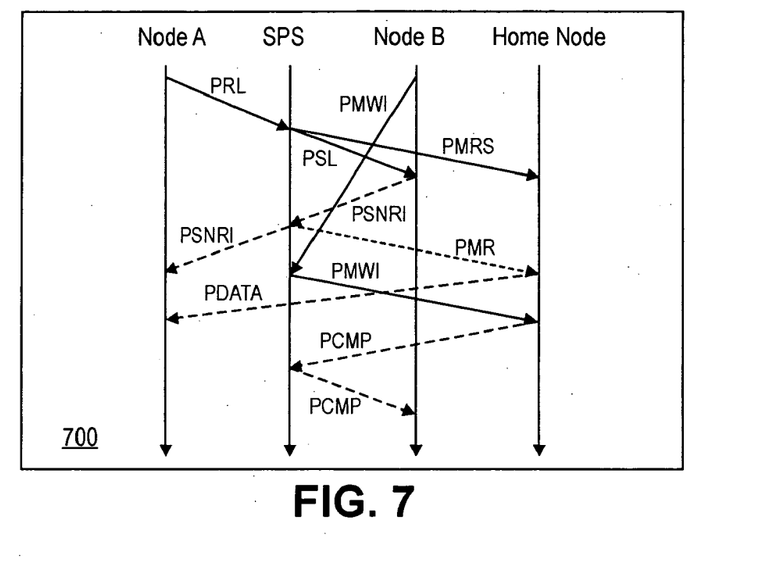
FIG. 7 illustrates a flow diagram of an embodiment of a process including a read-write conflict.

FIG. 7 illustrates a flow diagram or timing diagram 700 of an embodiment of a process including a read-write conflict. Initially, Node A initiates a PRL (read operation) and at about the same time, Node B initiates a PMWI (write operation). The write operation in question will invalidate the line in the Node B cache. However, due to the simultaneous nature of the operations, the read operation does a PMRS (speculative read) to the home node and a PSL (snoop line) to check status of the line in the Node B cache. The resulting PSNRI indicates that the line in the Node B cache is invalid (due to the PMWI) and the PMR reads the unwritten line from the Home Node. The PDATA completes the read by sending the data back to Node A. Then, the PMWI from the SPS to the Home Node writes the data and the PCMP signals that the write completed successfully, ignoring the incorrect data sent to Node A.

Figure 8A:
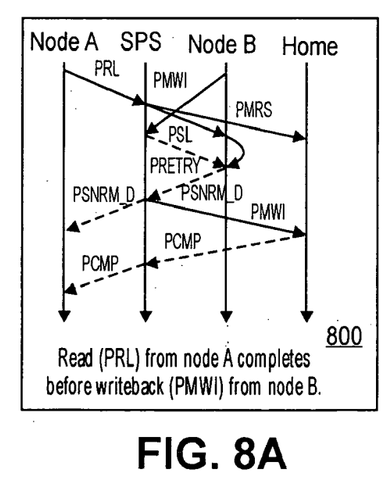
FIG. 8A illustrates a flow diagram of an embodiment of a process suitable for resolving a read-write conflict.

FIG. 8A illustrates a flow diagram or timing diagram 800 of an embodiment of a process suitable for resolving a read-write conflict. The PRL from Node A initiates the read operation and the PMWI from Node B initiates the write operation at about the same time, with the SPS (scalability port) receiving the PRL first. This time, the PMRS and PSL are set up to trigger the SPS to detect any conflict, and the PMWI is sent back to Node B with a PRETRY, causing the PSL to meet the returning PRETRY and read the data which is about to be written to the Home Node of the line. The read operation completes with the PSNRM_D completion, and the write is completed as a result of the read operation with the PMWI operation, resulting in completion with the PCMP completions.

Figure 8B:
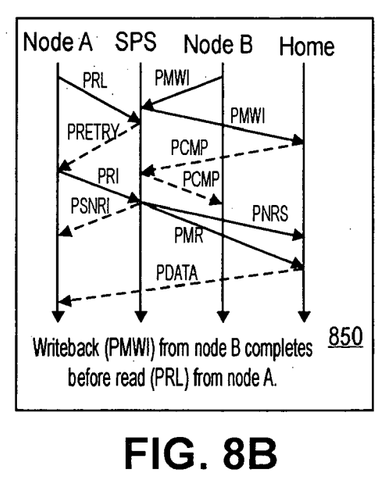
FIG. 8B illustrates a flow diagram of an alternate embodiment of a process suitable for resolving a read-write conflict.

FIG. 8B illustrates a flow diagram or timing diagram 850 of an alternate embodiment of a process suitable for resolving a read-write conflict. A PMWI (write operation) and PRL (read operation) are initiated, with the SPS receiving the PMWI first. The PMWI proceeds to the Home Node, and the write completes with the PCMP operations. In the meantime, the read operation is retried with the PRETRY and subsequent PRL operations, leading to the PSNRI (snoop invalidate), PMRS (speculative read) and PMR (read) operations, of which the PMR operation results in a PDATA completion with the newly written data. As will be appreciated, the determining factor in whether to complete the read or write first is which operation occurs at the SPS first.

Alternative Scalability Port Implementations

The following section addresses some of the alternative scalability port implementations which may be utilized within the spirit and scope of the invention. It will be appreciated that these are exemplary in nature rather than limiting. Other alternative embodiments will be apparent to those skilled in the art.

Figure 9:
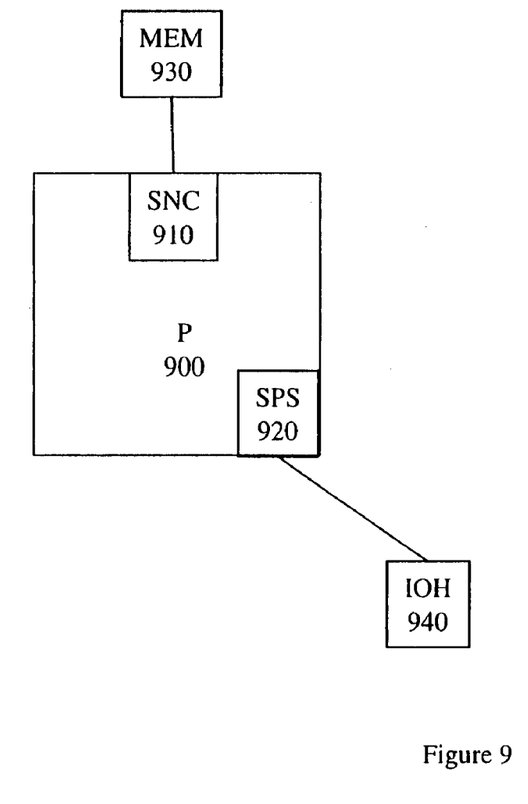
FIG. 9 illustrates a block diagram of an embodiment of a processor having portions of a scalability port integrated therein.

FIG. 9 illustrates a block diagram of an embodiment of a processor having portions of a scalability port integrated therein. Such an embodiment need not implement the protocol addressed in the previous section. In one embodiment, processor 900 includes scalability port node controller 910 and scalability port switch 920. Scalability port node controller 910 is suitable for coupling to a memory such as memory 930. Scalability port switch 920 is suitable for coupling to an I/O hub or interface such as I/O hub 940. Scalability port node controller 910 and scalability port switch 920 may collectively include an incoming request buffer, outgoing request buffer, memory control logic, snoop pending table and snoop filter. In one embodiment, scalability port node controller 910 includes an incoming request buffer, outgoing request buffer and memory control logic suitable for interfacing with memory 930. In such an embodiment, scalability port switch 920 may also include a snoop pending table, snoop filter and i/o interface logic suitable for interfacing with I/O hub 940. In such an embodiment, scalability port switch 920 may couple to the incoming request buffer and outgoing request buffer of scalability port node controller 910, and include i/o interface logic suitable for coupling to the I/O hub 940.

Figure 10:
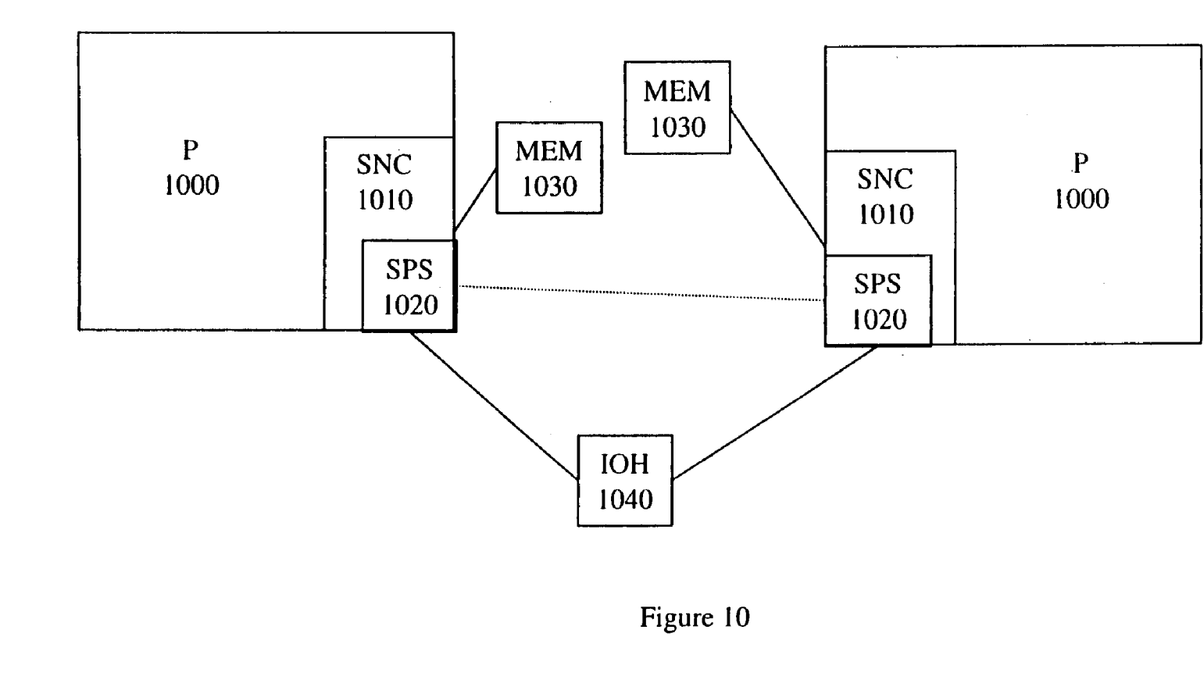
FIG. 10 illustrates a block diagram of an alternate embodiment of a processor having portions of a scalability port integrated therein.

FIG. 10 illustrates a block diagram of an alternate embodiment of a processor having portions of a scalability port integrated therein. In one embodiment, each instance of processor 1000 includes a scalability port node controller 1010 and scalability port switch 1020. Scalability port switch 1020 is part of scalability port node controller 1010, and collectively the two components (1010, 1020) include an incoming request buffer, outgoing request buffer, and control logic. Scalability port switch 1020 includes a snoop pending table, snoop filter, and i/o interface logic suitable for coupling to an I/O hub or other i/o device, such as I/O hub 1040. Scalability port node controller 1010 includes memory control logic suitable for interfacing with memory 1030. Note that memory 1030 may be separate for each processor 1000 or shared between two (or more) processors 1000.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 or 2 (among others) may be integrated into components, or may be subdivided into components. Similarly, the blocks of FIG. 6A or 7 (among others) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:
receiving a read request relating to a first line of data in a coherent memory system;
receiving a write request relating to the first line of data at about the same time as the read request is received;
detecting that the read request and the write request both relate to the first line;
determining that the read request of the read and write requests should proceed first;
delaying the write request after determining that the read request is to proceed first;
completing the request of the read request with a value from the write request; and
invalidating the write request.

2. The method of claim 1 wherein:
the read request is determined to proceed first when the read request is received first.

3. The method of claim 1 wherein:
detecting that the read request and the write request both relate to the first line is accomplished by comparing an address of the read request and an address of the write request.

4. The method of claim 3 wherein;
the method is performed within circuitry of a component the component suitable for coupling to a first processor and to a second processor, the read request originating from the first processor and the write request originating from the second processor.

5. The method of claim 4 wherein:
the read request is received first, the read request is determined to be the request which should proceed first, the write request is delayed.

6. The method of claim 1, further comprising writing the value from the satisfied read request to a memory.

7. The method of claim 1, wherein completing the read request includes the read request completing the write request independent of an origination node of the write request.

8. An apparatus comprising:
means for receiving a read request relating to a first line of data in a coherent memory system;
means for receiving a write request relating to the first line of data at about the same time as the read request is received, the means for receiving a write request coupled to the means for receiving the read request;
means for detecting that the read request and the write request both relate to the first line, the means for detecting coupled to the means for receiving the write request and the means for receiving the read request;
means for determining that the read request of the read and write requests should proceed first, the means for determining coupled to the means for detecting;
means for delaying the write request after determining that the read request is to proceed first;
first means for completing the request of the read request with a value from the write request, the first means coupled to the means for determining, the means for receiving the read request and the means for receiving the write request;
means for invalidating the write request; and
second means for completing the request of the write request which was not determined to be the request which should proceed first, the second means coupled to the means for determining, the means for receiving the read request and the means for receiving the write request, the second means further for using the value from the satisfied read request to complete the write request after the means for invalidating invalidates the write request.

9. The apparatus of claim 8, further comprising means for writing the value from the satisfied read request to a memory.

10. The apparatus of claim 8, wherein the means for completing the read request includes means for the read request completing the write request independent of an origination node of the write request.

11. The apparatus of claim 8, further comprising means for determining that the read request is to be the request which should proceed first because the read request is received first.

* * * * *